US009350607B2

(12) United States Patent
Agarwal et al.

(10) Patent No.: US 9,350,607 B2
(45) Date of Patent: May 24, 2016

(54) SCALABLE NETWORK CONFIGURATION WITH CONSISTENT UPDATES IN SOFTWARE DEFINED NETWORKS

(71) Applicant: International Business Machines Corporation, Armonk, NY (US)

(72) Inventors: Kanak B. Agarwal, Austin, TX (US); John B. Carter, Austin, TX (US); Colin K. Dixon, Austin, TX (US); Wesley M. Felter, Austin, TX (US); Brent E. Stephens, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 14/036,894

(22) Filed: Sep. 25, 2013

(65) Prior Publication Data
US 2015/0089032 A1 Mar. 26, 2015

(51) Int. Cl.
*G06F 15/177* (2006.01)
*H04L 12/24* (2006.01)
*H04L 29/12* (2006.01)

(52) U.S. Cl.
CPC ........ *H04L 41/0816* (2013.01); *H04L 41/0806* (2013.01); *H04L 41/0873* (2013.01); *H04L 41/0893* (2013.01); *H04L 61/103* (2013.01); *H04L 61/2038* (2013.01); *H04L 61/6022* (2013.01); *H04L 41/5096* (2013.01)

(58) Field of Classification Search
CPC combination set(s) only.
See application file for complete search history.

(56) References Cited

U.S. PATENT DOCUMENTS

| 6,151,324 | A | 11/2000 | Belser et al. |
| 6,292,838 | B1 | 9/2001 | Nelson |
| 6,457,059 | B1 * | 9/2002 | Kobayashi ............ H04L 12/185 709/242 |
| 6,553,028 | B1 | 4/2003 | Tang et al. |
| 6,711,171 | B1 | 3/2004 | Dobbins et al. |
| 7,075,910 | B2 | 7/2006 | Chen et al. |

(Continued)

FOREIGN PATENT DOCUMENTS

| CN | 1705307 A | 12/2005 |
| CN | 102318290 A | 1/2012 |

(Continued)

OTHER PUBLICATIONS

Drutskoy, Dmitry A. , "Software-Defined Network Virtualization with FlowN", Master's Thesis, Princeton University, Jun. 2012, 28 pages.

(Continued)

*Primary Examiner* — Saket K Daftuar
(74) *Attorney, Agent, or Firm* — Francis Lammes; Stephen J. Walder, Jr.; William J. Stock

(57) ABSTRACT

Mechanisms are provided for configuring a data flow between a source device and a destination device in a network. The mechanisms receive, from a network control application, a request to establish a network configuration corresponding to a data flow between the source device and the destination device. The request comprises a fine grained header field tuple for defining the data flow. The mechanisms allocate, from a shadow address pool, a shadow address to be mapped to the fine grained header field tuple. The shadow address pool comprises addresses not being used by devices coupled to the network. The mechanisms configure a network infrastructure of the network to route data packets of the data flow from the source device to the destination device based on the shadow address.

20 Claims, 4 Drawing Sheets

(56) References Cited

U.S. PATENT DOCUMENTS

| | | | |
|---|---|---|---|
| 7,620,040 B2* | 11/2009 | Bhaskaran | H04L 45/74 370/389 |
| 7,822,027 B2 | 10/2010 | Yadav et al. | |
| 8,059,644 B2* | 11/2011 | Bhaskaran | H04L 45/74 370/389 |
| 8,072,984 B2 | 12/2011 | Chang | |
| 8,358,648 B1* | 1/2013 | Breau | H04L 61/6004 370/260 |
| 8,432,807 B2 | 4/2013 | Kohn et al. | |
| 8,478,891 B1* | 7/2013 | Breau | H04L 61/6004 709/227 |
| 8,675,661 B1* | 3/2014 | Breau | H04L 45/52 370/389 |
| 8,867,349 B2 | 10/2014 | Martini et al. | |
| 8,996,683 B2 | 3/2015 | Maltz et al. | |
| 9,065,769 B2* | 6/2015 | Bhaskaran | H04L 45/74 |
| 2003/0133450 A1* | 7/2003 | Baum | H04L 29/12018 370/389 |
| 2003/0200311 A1* | 10/2003 | Baum | H04L 29/12122 709/224 |
| 2004/0071164 A1* | 4/2004 | Baum | H04L 29/12018 370/469 |
| 2005/0174998 A1* | 8/2005 | Vesterinen | H04L 29/12216 370/354 |
| 2006/0218296 A1* | 9/2006 | Sumner | H04L 29/12066 709/238 |
| 2007/0030826 A1* | 2/2007 | Zhang | H04L 29/06027 370/331 |
| 2008/0205377 A1 | 8/2008 | Chao et al. | |
| 2010/0111083 A1* | 5/2010 | Bhaskaran | H04L 45/74 370/389 |
| 2011/0299413 A1 | 12/2011 | Chatwani et al. | |
| 2012/0087369 A1* | 4/2012 | Bhaskaran | H04L 45/74 370/389 |
| 2012/0131576 A1* | 5/2012 | Hatta | G06F 9/5077 718/1 |
| 2012/0163174 A1 | 6/2012 | Shukla et al. | |
| 2012/0198091 A1 | 8/2012 | Kanada et al. | |
| 2013/0058341 A1 | 3/2013 | Fulton et al. | |
| 2013/0070762 A1 | 3/2013 | Adams et al. | |
| 2013/0086236 A1 | 4/2013 | Baucke et al. | |
| 2013/0152075 A1 | 6/2013 | Cardona et al. | |
| 2013/0208623 A1 | 8/2013 | Koponen et al. | |
| 2014/0013324 A1 | 1/2014 | Zhang et al. | |
| 2014/0023074 A1 | 1/2014 | Mishra et al. | |
| 2014/0177635 A1* | 6/2014 | Bhaskaran | H04L 45/74 370/392 |

FOREIGN PATENT DOCUMENTS

| | | |
|---|---|---|
| CN | 102857416 A | 1/2013 |
| CN | 103051629 A | 4/2013 |
| WO | WO2007/009352 A1 | 1/2007 |
| WO | WO2011/051182 A1 | 5/2011 |
| WO | WO2013/114489 A1 | 8/2013 |

OTHER PUBLICATIONS

Ghorbani, Soudeh et al., "Walk the Line: Consistent Network Updates with Bandwidth Guarantees", HotSDN '12, Aug. 13, 2012, ACM 2012, 6 pages.

Hu, Yan et al., "GARDEN: Generic Addressing and Routing for Data Center Networks", 2012 IEEE Fifth International Conference on Cloud Computing, IEEE, 2012, 8 pages.

Jiao, Liang et al., "MRS: A Click-based Multipath Routing Simulator", 2012 7th International ICST Conference on Communications and Networking in China, IEEE, 2012, 10 pages.

Moon, Daekyeong, "Achieving Flexibility and Performance for Packet Forwarding and Data Center Management", Dissertation, University of California, Berkeley, Technical Report No. UCB/EECS-2010-66, May 12, 2010, http://www.eecs.berkeley.edu/Pubs/TechRpts/2010/EECS-2010-66.html, 84 pages.

Mysore, Radhika N. et al., "Portland: A Scalable Fault-Tolerant Layer 2 Data Center Network Fabric", SigComm 2009, Aug. 17-21, 2009, ACM 2009, 12 pages.

Reitblatt, Mark et al., "Abstractions for Network Update", SigComm 2012, Aug. 13-17, ACM 2012, 12 pages.

Reitblatt, Mark et al., "Consistent Updates for Software-Defined Networks: Change You Can Believe In!" Hotnets '11, Nov. 14-15, 2011, ACM 2011, 6 pages.

Rosen, E et al., "Muitiprotocol Label Switching Architecture", Jan. 2001, http://tools.ietf.org/pdf/rfc3031.pdf, 62 pages.

Stephens, Brent, "Designing Scalable Networks for Future Large Datacenters", Thesis, Rice University, May 2012, 95 pages.

U.S. Appl. No. 14/072,018.

International Search Report and Written Opinion dated Dec. 31, 2014 for International Application No. PCT/CN2014/087324, 12 pages.

* cited by examiner

SCALABLE NETWORK CONFIGURATION WITH CONSISTENT UPDATES IN SOFTWARE DEFINED NETWORKS

BACKGROUND

The present application relates generally to an improved data processing apparatus and method and more specifically to mechanisms for providing scalable network configuration with consistent updates in software defined networks.

Software-defined networking (SDN) is an approach to computer networking which allows network administrators to manage network services through abstraction of lower level functionality. This is done by decoupling the system that makes decisions about where traffic is sent (the control plane) from the underlying systems that forwards traffic to the selected destination (the data plane). With SDN, network intelligence and state are logically centralized and the underlying network infrastructure is abstracted from the applications.

SDN requires some mechanism for the control plane to communicate with the data plane. One such mechanism, OpenFlow, is a standard interface designed specifically for SDN which structures communication between the control and data planes of supported network devices. OpenFlow allows direct access to, and manipulation of, the forwarding plane of network devices, such as switches and routers—both physical and virtual (hypervisor based). The OpenFlow protocol defines basic primitives that can be used by an external software application to program the forwarding plane of network devices, similar to the instruction set of a processor.

OpenFlow uses the concept of flows to identify network traffic based on pre-defined match rules that can be statically or dynamically programmed by the SDN control software. Since OpenFlow allows the network to be programmed on a per-flow basis, an OpenFlow-based SDN architecture provides extreme granular control, enabling the network to respond to real-time changes at the application, user, and session levels.

SUMMARY

In one illustrative embodiment, a method, in a data processing system comprising a processor and a memory, for configuring a data flow between a source device and a destination device in a network is provided. The method comprises receive, from a network control application, a request to establish a network configuration corresponding to a data flow between the source device and the destination device. The request comprises a fine grained header field tuple for defining the data flow. The method further comprises allocating, from a shadow address pool, a shadow address to be mapped to the fine grained header field tuple. The shadow address pool comprises addresses not being used by devices coupled to the network. The method also comprises configuring a network infrastructure of the network to route data packets of the data flow from the source device to the destination device based on the shadow address.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
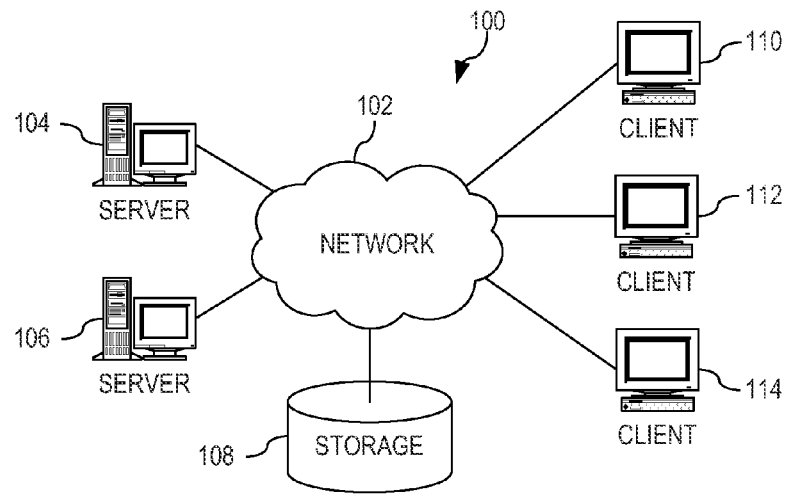
FIG. 1 is an example diagram of a distributed data processing system in which aspects of the illustrative embodiments may be implemented.

Current data packet (or simply "packet") forwarding requires switches in a data network to have matching rules to specify what direction to send an incoming packet, e.g., determining at each switch which port of the switch to transmit the packet through. As mentioned above, Software Defined Networking (SDN) architectures allow these matching rules to be computed and installed from a logically centralized controller. Under OpenFlow protocol, the matching rules are based on 12-tuples (OpenFlow allows matching rules to be installed based on 12 header fields). The matching of fields in OpenFlow can either be an explicit match or a wildcard match. A wildcard match means the switch does not care what the value is in the specified field. An explicit match is a binary match, i.e. it matches or it does not. Even though OpenFlow protocol supports installing rules with very fine-grained matching of the packet header fields, the overall flexibility is limited by the available storage in switches, where the fine-grained forwarding state can be stored. The fine-grained forwarding rules are typically installed in the switch Ternary Content Addressable Memory (TCAM).

In the current switches, TCAMs are a precious resource with very limited storage capability (e.g., a switch may only provide support for 750-1 K matching rules) because TCAM requires 6-7× as much chip area as SRAM to hold the same information. TCAMs in the current switch hardware are limited because they are designed to implement policy rules such as access controls and Quality of Service (QoS) rather than base forwarding. An OpenFlow enabled hardware allows the flexibility to use the TCAM to implement any fine-grained rule. However, due to TCAM size limitations, practical implementations are forced to use more coarse-grained matching rules and rule aggregation techniques, thus failing to provide the fine grained dynamic networking control purported by SDN.

On the other hand, matching rules that match only on the destination address, e.g., Destination Media Access Control (DMAC) address can be stored in a less expensive and higher capacity memory device, such as a SRAM, binary CAM, or the like. The current switch hardware contains very large tables that allow matching and forwarding based on the DMAC header field. Thus, while destination address only based matching rules are also coarse-grain rules, many more of these types of rules may be stored in the less expensive and higher capacity memory devices. Hence, an issue is provided that in order to obtain fine-grained dynamic network behavior in a SDN architecture, the complex tuple based matching rules should be utilized along with a storage mechanism in the switches of the network that can store a large number of rules inexpensively.

In addition, dynamic forwarding of matching rules from a centralized location, such as is provided in the SDN architecture, may lead to inconsistencies in the network switches. That is, during dynamic network updates, an inconsistent view of the network during the transition is created such that some switches in the network may have new matching rules deployed while other switches in the network may continue to operate using the older matching rules until they are updated. This leads to a situation where the order in which network switches are updated may make a difference in the way that the network handles the forwarding of data packets. This may cause potential packet loss, forwarding loops, policy violations, and the like.

The illustrative embodiments address these issues by providing mechanisms that provide scalable network configuration with consistent updates in software defined networks (SDNs). The illustrative embodiments utilize a Media Access Control (MAC) address indirection methodology and mechanism that enables using Destination Media Access Control (DMAC)-based rules for fine grained forwarding that may be stored in a low cost, high capacity, storage device of the switches in place of a TCAM based storage. In other words, the illustrative embodiments allow TCAM entries to be transformed into DMAC match based entries that can be installed into much larger table data structures of a less expensive, high capacity storage device. The illustrative embodiments further provide fast, consistent, and one-touch network updates with per packet consistency where per packet consistency ensures that a packet always sees either the old set of rules or the new set of rules during update, but never a combination of the two.

In particular, the illustrative embodiments utilize a pool of shadow (not-in-use) MAC addresses in the network controller that can be assigned to fine-grained data flows, i.e. a data flow (or simply "flow") identified by source-destination pair. The shadow MACs are used to provide fine-grained, flow-based forwarding rules while still using DMAC-based forwarding using storage devices having plentiful table storage space. The mechanisms of the illustrative embodiments allow mapping fine-grained data flow to a destination shadow MAC address and installing rules in the switches based on matching the shadow MAC in the DMAC header field. In order to implement the fine-grained data flow to shadow MAC mapping mechanisms of the illustrative embodiments, two possible methodologies and associated mechanisms may be utilized. A first methodology and mechanism is based on Address Resolution Protocol (ARP) spoofing, while the second methodology and mechanism is based on MAC address rewriting.

With regard to the ARP spoofing methodology and mechanisms, the network controller maintains a network address, e.g., Internet Protocol (IP), to real and shadow MAC address mapping in a local table data structure. In this methodology, the same network address for a destination can be mapped to multiple shadow MAC addresses. Each shadow MAC corresponds to the fake MAC address for the destination device, which is seen as the real destination MAC address by a particular source host in the network. That is, for example, the IP address of the destination device is mapped to the real MAC address of the destination device, and is also mapped to the one or more shadow MAC addresses. A different shadow MAC can be assigned to the same destination by the network controller for different source hosts that want to communicate with the destination. This IP address to shadow MAC mapping is assigned to the source-destination pair. When an ARP request for resolving the destination MAC address is transmitted by the source, it is intercepted by the network controller. The network controller, in response to this ARP request from the source, returns a response to the source device indicating that the address of the destination device is the shadow MAC address that the network controller assigned to the source-destination pair. As a result, the source device uses the shadow MAC address to communicate with the destination device. Prior to the ARP response message being sent to the source device, and in some embodiments prior to the ARP request message being sent from the source device, switches in the network are configured to use the shadow MAC address to forward the packets to the destination device. That is, the switches are configured to utilize shadow MAC based forwarding rules in their respective forwarding databases.

When the mapping of network address to shadow MAC address for a source-destination pair changes, or a new IP address to shadow MAC mapping for the source-destination pair is created, the network controller sends a gratuitous ARP message, i.e. a ARP response message that is not in response to a ARP request, to the source device indicating that the destination MAC address has changed. As a result, all subsequent data packets sent by the source device will use the new shadow MAC address. This may occur, for example, when it is desirable to change the route between the source device and destination device.

With this methodology, the destination device is also configured for accepting data packets directed to the shadow MAC. In one illustrative embodiment, this may be accomplished by having the destination device configure its network interface card (NIC) or adapter to operate in a "promiscuous" mode of operation. With the "promiscuous" mode of operation, the NIC is configured to process any received data packets rather than only those having a destination address matching its own real MAC address. As a result, when data packets using the shadow MAC are received by the destination device's NIC, the destination device's NIC will process the data packets even though, from the destination device's perspective, the data packets have a destination address that is different from the address of the destination device, i.e. the shadow MAC is not the real MAC of the destination device.

With the MAC address rewriting methodology, the destination address for a source-destination pair is rewritten at the edge switches of the network, where an edge switch is the switch through which the source device or destination device communicates with the remaining infrastructure of the network. At the source edge switch, a MAC address rewrite is performed to rewrite the actual, or real, destination MAC address to replace it with a shadow MAC address assigned by the network controller to the corresponding fine-grained flow. That is, the network controller sends an address rewrite command to the source edge switch specifying that the destination MAC address should be overwritten with the assigned shadow MAC address for a particular data flow. Thus, data packets belonging to the data flow with the destination MAC address in their header are rewritten to replace the real destination MAC address with the shadow MAC address assigned to the destination for the flow.

Similarly, the network controller sends an address rewrite command to the destination edge switch instructing the destination edge switch to rewrite the shadow MAC address to the destination device's actual, or real, MAC address. The destination edge switch maintains this rewrite rule in local storage and when a data packet is received whose header has the shadow MAC address, the switch rewrites the data packet header to replace the shadow MAC address with the actual MAC address of the destination. This rewriting in the edge switches may be implemented in the physical edge switches, and it may also be implemented in hypervisor virtual switches of the source and destination devices themselves. In either case, the mechanisms of this second methodology allow different shadow MACs to be assigned to represent different data flows between the same source-destination pair. This enables more fine-grained control than the ARP spoofing mechanism where all data flows from a source to a given destination see the same shadow MAC address as the MAC address for the destination.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
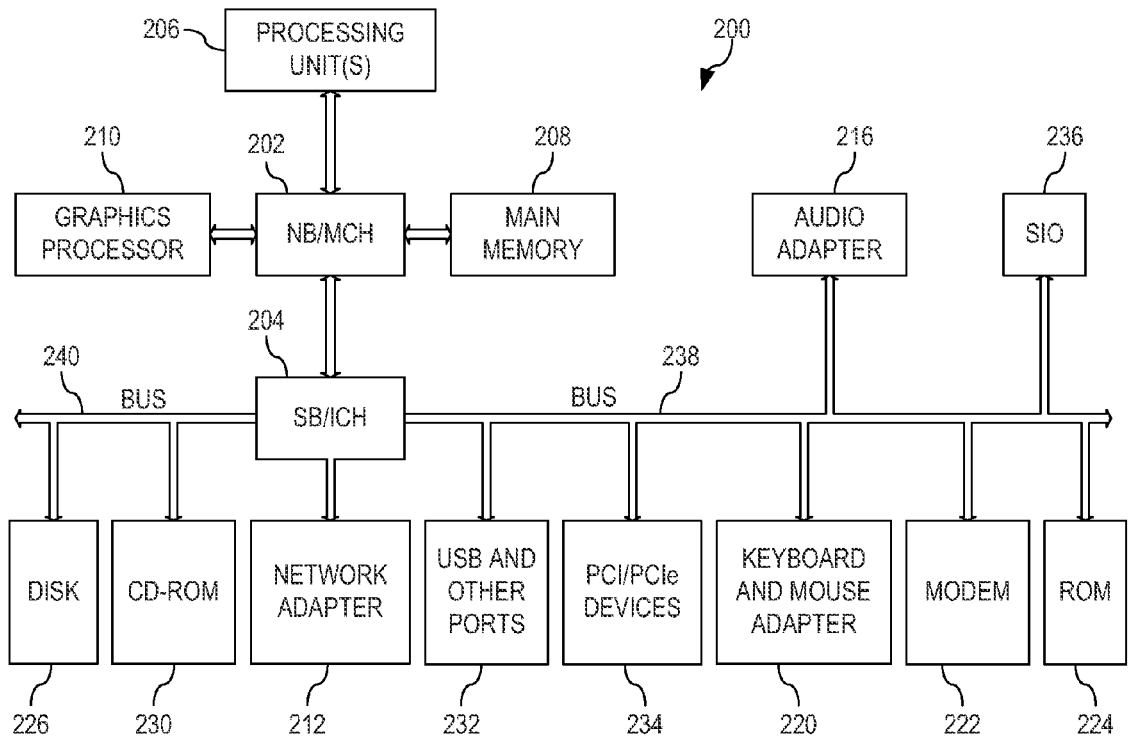
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like.

In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the network 102 is comprised of a plurality of network routing and forwarding devices, e.g., switches, routers, and the like. One or more of the computing devices coupled to the network 102, e.g., server 104 or 106, may implement a network controller, such as a Software Defined Network (SDN) controller that, in accordance with the illustrative embodiments, provides mechanisms for maintaining a pool of shadow MAC addresses, i.e. MAC addresses that are not in use by actual devices in the network, that can be assigned to fine-grained flows, for example, data flows defined by source-destination pair associations. The controller maintains a mapping of a data flow to a shadow MAC assignment. When a source computing device, such as a client computing device 110, for example, wishes to communicate with a destination computing device, e.g., server 104 or client computing device 112, a data flow is established between the source and destination devices. In establishing this data flow, or in modifying the route of this data flow, the SDN controller, or the like, may configure the source device of the data flow to utilize a shadow MAC address allocated to the data flow defined by the source address-destination address pair, from the pool of shadow MAC addresses, to replace the destination device's real address for this data flow. This mapping of source address-destination address (source-destination) pair (or other tuple, such as a 5-tuple comprising source address, destination address, source port, destination port, and protocol, for example) to shadow MAC address is stored in a mapping data structure stored by the controller.

Based on the selection and assignment of a shadow MAC address to a source-destination pair, or other more complex tuple, the mechanisms of the illustrative embodiments further provide logic for intelligently forwarding data packets for a communication connection between the source device and destination device using the assigned shadow MAC address. The new forwarding rules based on the shadow MAC address are installed in the infrastructure of the network, e.g., switches, routers, and the like.

The installation of the routing based on the shadow MAC address comprises the controller generating matching rules keyed to the shadow MAC address as the destination MAC address and pushing these matching rules out to the network infrastructure, hereafter referred to simply as the "switches" to make the explanation of the illustrative embodiments easier to comprehend. Since the matching rules match only on the destination shadow MAC address, they may be stored in the switches in the forwarding database (FDB) of the switches, which is stored in the lower cost, higher capacity storage of the switches rather than a TCAM or other similar structure having limited and relatively smaller capacity and relative higher cost in terms of complexity of design.

In addition to configuring the switches with the new matching rules based on the assigned shadow MAC address, the destination device is also configured to accept data packets for the new shadow MAC. In one illustrative embodiment, the acceptance of data packets destined for the new shadow MAC is achieved by configuring the network adapter to operate in a "promiscuous" mode of operation, whereby the network adapter accepts and processes all data packets, even those whose destination address does not match the destination address of the destination device. That is, the shadow MAC address does not match the destination address and is a stand-in for the destination address. Thus, to the destination device, the shadow MAC address does not match its own address and hence, in normal operation, the network adapter would not process the data packet whose header information indicates that the data packet is destined for the shadow MAC address. In a promiscuous mode of operation, the network adapter processes all data packets regardless of whether their destination address in their headers matches the address of the destination device. As a result, data packets with the shadow MAC address for a destination address will be processed by the network adapter.

In another illustrative embodiment, the edge switches of the network are configured to support address rewriting. At the destination device, the controller instructs an edge switch associated with the destination device to perform address rewriting to rewrite the shadow MAC address to the actual destination address of the destination device. At the source device, the controller instructs an edge switch associated with the source device to perform address rewriting to rewrite the destination address to the shadow MAC address. In one illustrative embodiment, at least one of the source edge switch or the destination edge switch may be a hypervisor virtual switch (vSwitch). This further enables multiple different data flows between the same source device and destination device pair to be represented using different shadow MAC addresses. This is accomplished by installing a re-write rule in the source edge switch that identifies a flow by performing a fine-grained matching of the header fields (for example, matching on destination port in addition to source and destination address) and re-writing the destination MAC to the shadow MAC assigned to flow.

Each of the implementations described above will now be described in greater detail with regard to the remaining figures. While the illustrative embodiments will be described with regard to a Software Defined Networking (SDN) architecture utilizing OpenFlow protocol based controllers, the illustrative embodiments are not limited to such and may be used in any architecture that implements a centralized configuration mechanism that configures the infrastructure of the network.

Figure 3:
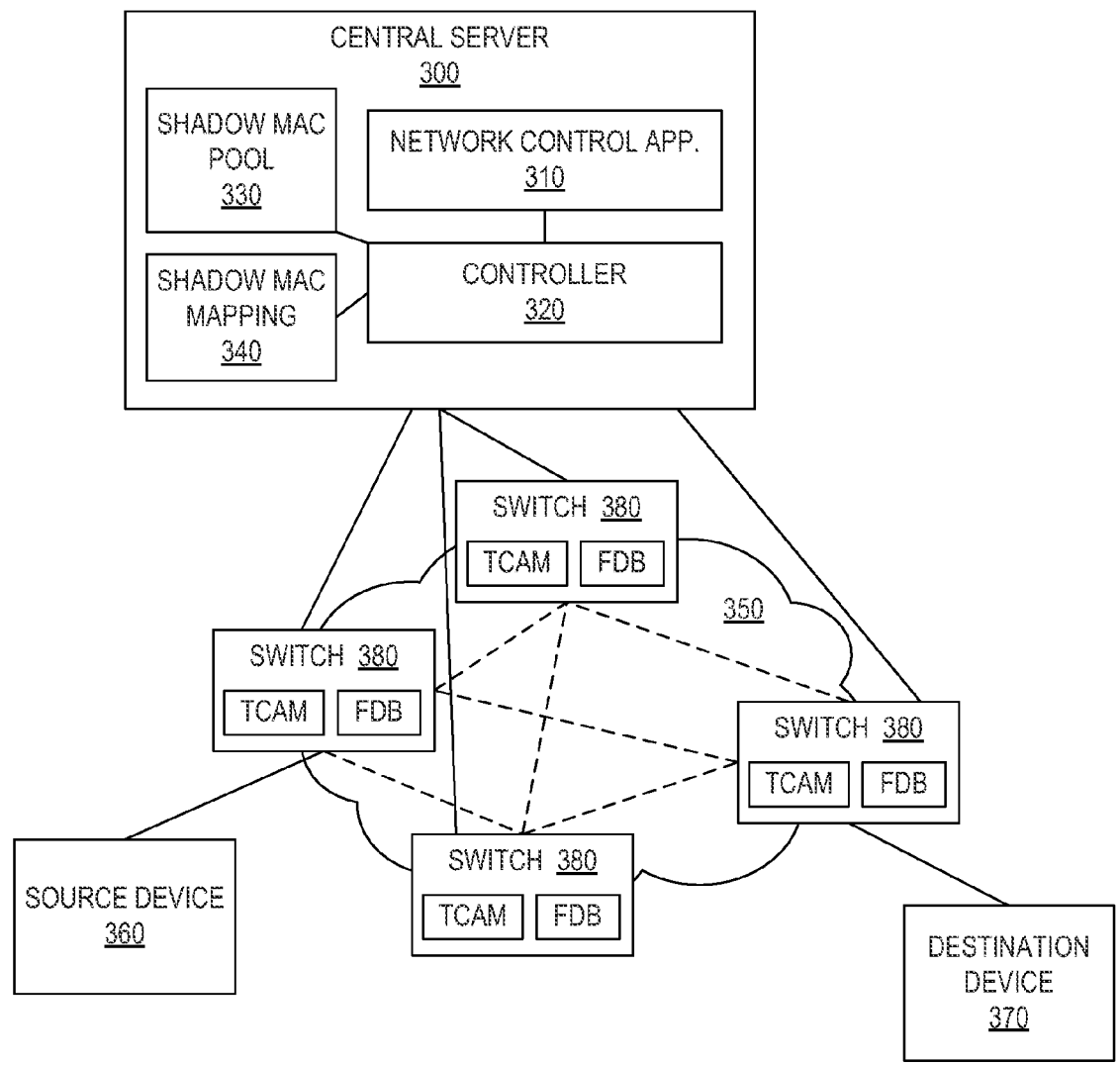
FIG. 3 illustrates a first implementation in which ARP spoofing is implemented in accordance with one illustrative embodiment.

FIG. 3 illustrates a first implementation in which ARP spoofing is implemented in accordance with one illustrative embodiment. As shown in FIG. 3, the centralized server 300 comprises a network control application 310, e.g., Quality of Service (QoS) application, security application, or the like, and a controller 320. The network control application 310 is an application that performs a higher level determination of network configuration to achieve a desired functionality. The network control application 310 utilizes controller 320 Application Programming Interfaces (APIs) to communicate with the controller 320 to effect the deployment of rules to the network infrastructure, e.g., switches, routers, etc., so as to implement the desired functionality. For example, the network control application 310 may be a security application and may use the controller 320 API to direct the controller 320 to install certain rules in the switches to implement certain controls for controlling communications through the network.

The controller 320 is responsible for communicating to the network infrastructure the matching rules for ensuring that the network infrastructure 350 operates properly to provide a communication connection between the source computing device 360 and the destination computing device 370. In addition, the controller 320 works in conjunction with a shadow MAC pool 330 and shadow MAC mapping data structure 340. The shadow MAC pool 330 stores shadow MAC addresses, i.e. MAC addresses that are not being used by other devices in the network, which can be allocated by the controller 320 to connections between a source device 360 and destination device 370 to replace the destination address for matching rules deployed to switches. Mappings of the shadow MAC addresses to particular source-destination pairs, or other more complex tuples of connection header fields, may be stored in the shadow MAC mapping data structure 340.

A matching rule is comprised of data flow header fields against which a matching is performed with header data of a data packet, and an associated action, which comprises an identification of how the data packet is to be routed, e.g., which output port of a switch is to be used to transmit the data packet to the next link of the route from the source device 360 to the destination device 370. In architectures where the matching rules are based on source and destination address, and possibly more header field elements, very fine grained data flows are made possible. However, the complexity of the matching requires a complex and low capacity storage device in the switches 380 of the network infrastructure 350, such as a TCAM storage device as previously described. For example, matching rules may take the form of source address, destination address, source port, destination port, and protocol (a 5-tuple) with an action of "output:4" meaning that a data packet having header fields matching all 5 of the fields in the 5-tuple will be output by the switch 380 on port 4.

With the mechanisms of the illustrative embodiment, rather than enabling such fine grained data flow capability by implementing high cost, low capacity TCAMs, or similar storage devices, in each of the switches 380 of the network infrastructure so that the fine grained complex matching rules may be stored and utilized in each of the switches 380, the illustrative embodiments map the header field tuples to a shadow MAC address, and the tuples with the allocated shadow MAC address are stored in the shadow MAC address mapping data structure 340. Furthermore, provisions are made at the source and destination such that all packets in the flow use the assigned shadow MAC for communication. As a result, the matching rules deployed to the switches 380 may be based on a single destination MAC header field matching, e.g., shadow MAC address, which simplifies the matching rules such that they may be stored in low cost, high capacity memories of the switches 380, e.g., a SRAM, binary CAM, or the like. Thus, the mechanisms of the illustrative embodiments transform complex matching rules based on matching data packet header field tuples into simplified matching rules based on the destination address alone, which in accordance with the illustrative embodiments is replaced by the shadow MAC address allocated from the shadow MAC address pool 330.

When a network control application 310 wishes to install a set of rules for a fine-grained control of network flows between the source device 360 and the destination device 370, it passes the request to the controller 320. The network control application 310 may determine to install such a set of rules for various reasons including, but not limited to, the following scenarios. For example, if a new host system joins the network, the network control application 310 may detect the addition of the new host system and initiating a process of installing routes from other host systems to the new host system through shadow MAC based forwarding rules deployed to the network infrastructure. As another example, as part of a traffic engineering operation that monitors network usage, the network control application 310 may determine that the currently installed route for a data flow is congested and may determine a new route between the source and destination devices. As a result, the network control application 310 may initiate the installation of the set of rules to establish this new route. Thus, network control application 310 may determine, based on various events or conditions monitored in the network, to install new routes or modify existing routes for data flows through the network and in so doing, determine that a new set of rules are to be deployed into the network infrastructure. In accordance with the mechanisms of the illustrative embodiments, these new sets of rules are configured to match on an allocated shadow MAC address, as described herein.

The controller 320 allocates a shadow MAC address from the shadow MAC pool 330 to the source-destination pair, or to whichever complex tuple is used by the architecture for matching rules, i.e. the combination of header fields used in matching rules. The source address and destination address (or a more complex tuple) is stored in association with the allocated shadow MAC address in the shadow MAC address mapping data structure 340.

Once the mapping of the allocated shadow MAC address to the header fields that are a basis for the matching rules is performed, and the shadow MAC address mapping is stored in the mapping data structure 340, the controller 320 installs the new route between the source device 360 and the destination device 370 into the switches 380 of the network infrastructure 350 by deploying matching rules to the switches 380 based on the shadow MAC address assigned to the destination address of the source-destination pair. That is, the deployed matching rules are matched only on the destination address which is replaced in these matching rules with the allocated shadow MAC address. The switches 380 store their respective matching rules keyed to the destination shadow MAC address in their forwarding databases (FDBs) in their high capacity, low cost storage devices, e.g., memories, such as a SRAM, binary CAM, or the like.

The controller 320 further sends commands or otherwise causes the destination device to be configured to accept data packets for the new shadow MAC address. The destination device can be configure by installing the shadow MAC to real MAC re-write rule in the edge switch, i.e. a switch 380 of the network infrastructure 350 to which the destination device 370 directly connects. Alternatively, the network adapter of the destination device 370 can be configured to accept data packets whose destination address in their header indicates the shadow MAC address. This may be accomplished, for example, by placing the destination device 370 network adapter into a promiscuous mode of operation such that all data packets received by the network adapter are processed by the network adapter rather than merely forwarding data packets not having a matching destination address as the destination address of the destination device 370.

Furthermore, the controller sends a gratuitous Address Resolution Protocol (ARP) response message to the source device 360 indicating to the source device 360 that the destination address for the destination device 370 has changed and is now the shadow MAC address. As a result, the source device 370 will utilize the shadow MAC address in the header of the data packets when sending data packets to the destination device 370. These data packets will be forwarded by the switches 380 through the network infrastructure 350 by applying the matching rules, stored in the switch's FDB in the local storage of the switches, to the headers of the received data packets and performing the associated actions for rules matching the destination address in the header of the packet. Thus, rules having the shadow MAC address will match to data packets having a destination address in their header field that corresponds to the shadow MAC address. The associated actions are performed to at the switches 380 to forward the data packet through the particular output port specified in the matching rule. When the data packet is received at the destination device 370, the network adapter associated with the destination device 370 accepts and processes the data packet since it has been configured to do so, such as by placing it in a promiscuous mode of operation.

When the connection between the source and destination devices 360, 370 is torn down, the controller 320 is informed and the corresponding shadow MAC address allocated to the connection is freed and returned to the shadow MAC address pool 330. The corresponding entry in the shadow MAC address mapping data structure 340 is invalidated and may be overwritten by future entries.

In a second implementation, rather than using ARP spoofing (which is used at the source device to send the traffic to the shadow MAC) and setting the destination device network adapter to operate in the promiscuous mode (which is used at the destination device to accept the traffic destined to the shadow MAC at the destination), the mechanisms of the illustrative embodiments may reconfigure the edge switches to perform destination address rewriting. That is, a rewrite rule may be deployed in the edge switches to cause the destination address in the data packets transmitted and received to one of the actual destination address or the shadow MAC address. The edge switches themselves may be actual physical switches in the network infrastructure 350 or may be virtual switches associated with the source and destination devices, such as a vSwitch provided in the hypervisors of the source and/or destination devices 360, 370.

For example, at the source device 360 edge switch a rule is deployed by the controller 320 to rewrite the destination address in transmitted data packets belonging to the data flow to be replaced with the allocated shadow MAC address. At the destination device 370 edge switch, a rule is deployed by the controller 320 to rewrite the shadow MAC address in received data packets to the actual or real destination address of the destination device 370. In this implementation, the destination device 370 network adapter need not be reconfigured into the promiscuous mode of operation since the data packets received at the network adapter will have to actual destination address of the destination device 370.

The above scheme not only provides a benefit in that TCAM usage is reduced, but it also provides consistent updates of data flow rules in the network switches with per packet consistency. If the rules corresponding to a data flow need to be updated, then the controller 320 assigns a fresh shadow MAC address to the data flow and installs new rules in the switches 380 based on the new shadow MAC address. Next the controller configures the destination edge switch to re-write the new shadow MAC address to the real MAC address of the destination. If the destination network adapter is already configured in the promiscuous mode then the destination edge configuration may not be required. Finally, when all this setup is done, the controller tells the source to use the new shadow MAC address for communication with the destination. As discussed previously, this can be done either by sending a gratuitous ARP to the source or by installing an address rewrite rule in the source edge switch.

It should be appreciated that, in either of the implementations chosen above, in-flight data packets continue to use the old matching rules and route data packets based on the old shadow MAC address allocated to the data flow or the real destination MAC address of the destination if no previous shadow MAC address was assigned to the data flow. That is, the matching rules based on the new shadow MAC address do not replace the already present matching rules in the switches 380 that are either based on the actual destination address of the destination device 370 or the previous shadow MAC address. New data packets in the data flow using the new shadow MAC address will match to the new shadow MAC address based matching rules that are deployed to the switches 380 and stored in the low cost, high capacity storage devices of the switches 380. Moreover, the use of rules based on old configuration prior to the update phase out over time as the newer data packets will utilize the new shadow MAC address until the connection is torn down. This enables per packet consistency during update as no packet in the flow sees a combination of old and new rules.

In another illustrative embodiment, the switches 380 of the network infrastructure 350 may be pre-installed with alternate paths using different shadow MAC addresses and the destination edge switch, either physical or virtual switches, may be pre-configured to receive data packets for shadow MAC addresses when such a mode is enabled, e.g., by activating rules for performing rewriting of the destination address field of data packets, for example. In such a case, a one-touch update is made possible by using the gratuitous ARP message from the controller 320 to instruct the source device 360 that the destination device 370 address is now the selected shadow MAC address which corresponds to one of the pre-installed paths. Alternatively, one touch update can be made by installing a rewrite rule in the source edge switch which rewrites the destination device 370 address to the selected shadow MAC address corresponding to one of the pre-installed paths. This essentially activates the pre-configured path in the switches 380 in a fast concurrent manner. Because the larger capacity storage devices in the switches 380 are utilized with the mechanisms of the illustrative embodiments, many different pre-configured routes may be made possible in the switches 380, any of which may be enabled by the sending of a gratuitous ARP message from the controller 320 or by sending a new rewrite rule to the source edge from the controller 320.

Thus, the illustrative embodiments provide mechanisms for transforming tuple based matching rules to matching rules that are based on a destination address only while maintaining the fine grained matching rule capability. The fine grained matching rule capability, and thus, routing of data packets is achieved by allowing the tuples to be mapped to shadow MAC addresses which then replace the destination address in the data packets transmitted by the source device to the destination device. Thus, each different tuple may be associated with a different shadow MAC address. Moreover, in some illustrative embodiments, where destination address rewriting mechanisms are implemented, the same source and destination pair may have multiple shadow MAC addresses associated with them, one for each separate data flow between these devices.

Figure 4:
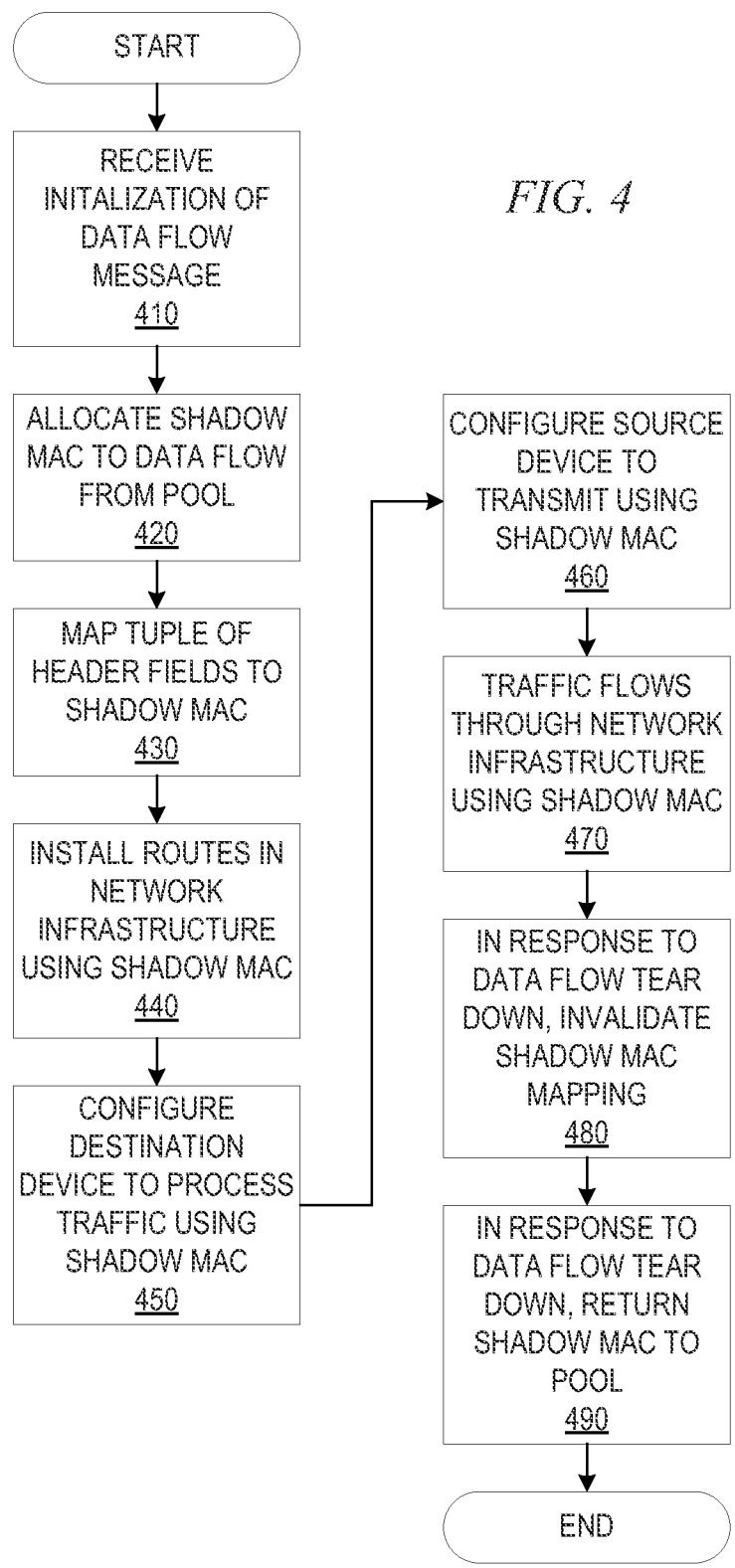
FIG. 4 is a flowchart outlining an example operation for performing shadow MAC address based networking in accordance with one illustrative embodiment.

FIG. 4 is a flowchart outlining an example operation for performing shadow MAC address based networking in accordance with one illustrative embodiment. As shown in FIG. 4, the operation starts by receiving, by the controller, a message from an application to establish a set of rules in the switches for a data flow between the source device and a destination device (step 410). The controller allocates a shadow MAC address to the fine-grained data flow between the source and destination device from a pool of shadow MAC addresses (step 420). The controller maps the tuple of the header fields for the data flow to the shadow MAC address allocated to the data flow (step 430). The tuple may be the source address-destination address pair, a more complex tuple of source address, destination address, source port, destination port, and protocol, or the like.

The controller installs the appropriate route or the set of rules between the source device and destination device in the switches of the network infrastructure using the allocated shadow MAC address (step 440). This may involve generating and deploying to each of the switches one or more appropriate matching rules that match based on the shadow MAC address as the destination MAC address.

The controller configures the destination device to receive and process data packet traffic having a destination address in the header fields that matches the shadow MAC address (step 450). Depending upon the particular implementation desired, this may be accomplished by setting the network adapter of the destination device to operate in a promiscuous mode or setting an edge switch (physical or virtual) to perform destination address rewriting to rewrite a destination address in received data packets having the shadow MAC address such that the shadow MAC address is replaced with the actual destination address of the destination device. The setting of the edge switch to perform the destination address rewriting may comprise deploying a rule into the edge switch that matches on the shadow MAC address that has an associated action that rewrites the shadow MAC address with the destination address.

The controller configures the source device to transmit data packets using the allocated shadow MAC address (step 460). This may be accomplished, for example, by sending a gratuitous ARP message to the source device to inform the source device that the address of the destination device has been changed to the shadow MAC address. Alternatively, the controller may deploy a rule to an edge switch (physical or virtual) associated with the source device that causes the source device to rewrite the destination address of packets received in the edge switch that have a destination address corresponding to the destination address of the destination device and it matches the other header fields to fine-grained tuple that we want to control such that the destination address in headers of data packets is rewritten to be the allocated shadow MAC.

Traffic then flows through the network infrastructure using the shadow MAC address as the destination address in headers of the data packets (step 470). The flow of the traffic through the network is based on the matching of matching rules in the switches to the shadow MAC address and performing the corresponding action specified in the matching rules. In response to the data flow between the source and the destination device being torn down, the mapping of the tuples to allocated shadow MAC addresses is invalidated (step 480) and the shadow MAC address is returned to the pool of available shadow MAC addresses (step 490). The operation then terminates.

Figure 5:
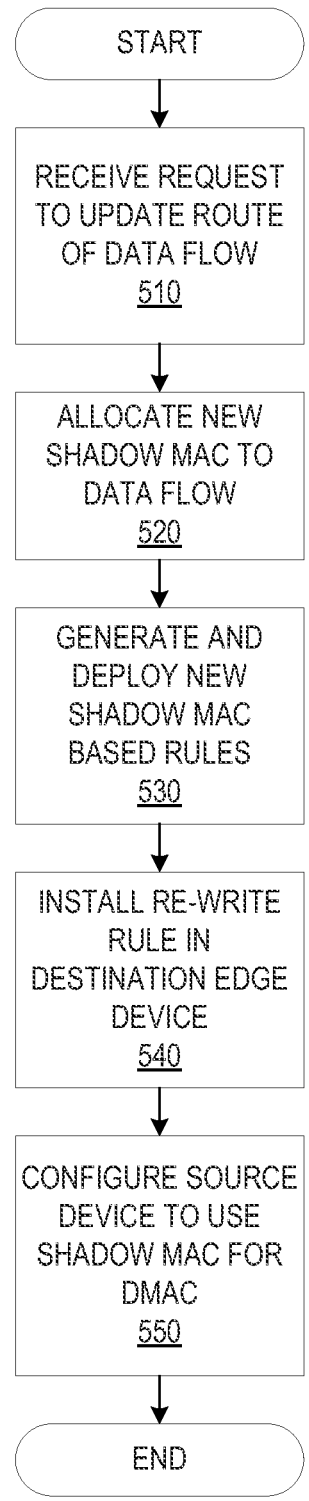
FIG. 5 is a flowchart outlining an example operation for performing route updates in switches of a network in accordance with one illustrative embodiment.

FIG. 5 is a flowchart outlining an example operation for performing route updates in switches of a network in accordance with one illustrative embodiment. As shown in FIG. 5, the operation starts with the controller receiving a request to modify or update a route for a data flow (step 510). The controller allocates a new shadow MAC address from the pool of shadow MAC addresses to the data flow (step 520). New shadow MAC based rules are generated and installed into the network infrastructure, e.g., in switches, routers, etc. (step 530). These shadow MAC based rules may comprise rules that match on various shadow MAC addresses and are deployed into the switches prior to allocation of the shadow MAC addresses to data flows. A re-write rule is installed at the destination edge device to re-write the shadow MAC address to be the actual or real address of the destination device (step 540). It should be appreciated that while these operations are being performed, the old shadow MAC rules are still in place and data packets belonging to the data flow continue to be forwarded using the old shadow MAC address and rules matching on the old shadow MAC address.

The controller sends a gratuitous ARP or otherwise installs a re-write rule in the source edge device to cause the source device to use the shadow MAC address as the DMAC for the destination device (step 550). The operation then terminates.

At this point, the route from the source device to the destination device has been updated in a consistent manner and all new data packets of the data flow are directed to the new shadow MAC address based configuration. The old data packets still using the old shadow MAC address and corresponding forwarding rules in the network infrastructure are phased out after a time interval which is long enough to ensure that all old packets have been flushed from the network.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for configuring a portion of a network corresponding to a data flow between a source device and a destination device in the network, the method comprising:
    receiving, by the processor from a network control application, a request to establish a network configuration corresponding to the data flow between the source device and the destination device, wherein the request comprises a fine grained header field tuple for defining the data flow and wherein the fine grained header field tuple comprises a destination address and at least one of a source address, a source port, a destination port, and a protocol;
    allocating, by the processor from a shadow address pool, a shadow address to be mapped to the fine grained header field tuple, wherein the shadow address pool comprises addresses not being used by devices coupled to the network and wherein the shadow address replaces the destination address for the destination device in the data flow;
    configuring, by the processor, a network infrastructure of the network to route data packets of the data flow from the source device to the destination device based on the shadow address, wherein configuring the network infrastructure to route data packets of the data flow from the source device to the destination device based on the shadow address comprises:
        configuring, by the processor, the source device to use the shadow address as the destination address in data packets transmitted by the source device; and
        configuring, by the processor, the destination device to process data packets having a destination address corresponding to the shadow address; and
    forwarding, by the processor, one or more data packets in the data flow from the source device to the destination device using the shadow address for the destination device.

2. The method of claim 1, wherein configuring the source device to use the shadow address as the destination address comprises transmitting to the source device an Address Resolution Protocol (ARP) message indicating to the source device that the destination address for the destination device has changed to the shadow address.

3. The method of claim 1, wherein configuring the destination device to process data packets having a destination address corresponding to the shadow address comprises configuring a network adapter of the destination device to be in a promiscuous mode of operation.

4. The method of claim 1, wherein configuring the network infrastructure to route data packets of the data flow from the source device to the destination device based on the shadow address comprises:
    deploying, by the processor at a source edge switch, a first rule to replace, in headers of data packets belonging to the data flow, a destination address corresponding to the destination address of the destination device with the shadow address; and
    deploying, by the processor at a destination edge switch, a second rule to replace, in headers of data packets belonging to the data flow, the shadow address to the destination address of the destination device.

5. The method of claim 4, wherein at least one of the source edge switch or the destination edge switch is a virtual switch in a hypervisor.

6. The method of claim 1, wherein configuring the network infrastructure to route data packets of the data flow from the source device to the destination device based on the shadow address comprises:
    prior to receiving the request, pre-configuring, by the processor, switches in the network infrastructure with pre-configured matching rules based on the shadow address; and
    enabling, by the processor, utilizing of the pre-configured matching rules in the switches of the network infrastructure by configuring the source device to use the shadow address as the destination address for the destination device.

7. The method of claim 1, wherein the shadow address is a shadow Media Access Control (MAC) address and the shadow address pool is a pool of shadow MAC addresses.

8. The method of claim 1, wherein configuring the network infrastructure of the network to route data packets of the data flow from the source device to the destination device based on the shadow address comprises:
    deploying, by the processor to switches of the network infrastructure, one or more matching rules specifying the shadow address as a matching condition of the matching rules, and a corresponding action to be performed on data packets having the shadow address as a destination address in the headers of the data packets.

9. The method of claim 8, wherein, at each of the switches, the one or more matching rules are stored in a forwarding database stored in a low cost, high capacity storage device of the switch.

10. A computer program product comprising a non-transitory computer readable storage medium having a computer readable program stored therein, wherein the computer readable program, executed on a computing device coupled to a network, causes the computing device to:

receive, from a network control application, a request to establish a network configuration corresponding to a data flow between a source device and a destination device, wherein the request comprises a fine grained header field tuple for defining the data flow and wherein the fine grained header field tuple comprises a destination address and at least one of a source address, a source port, a destination port, and a protocol;

allocate, from a shadow address pool, a shadow address to be mapped to the fine grained header field tuple, wherein the shadow address pool comprises addresses not being used by devices coupled to the network and wherein the shadow address replaces the destination address for the destination device in the data flow;

configure a network infrastructure of the network to route data packets of the data flow from the source device to the destination device based on the shadow address, wherein the computer readable program to configure the network infrastructure to route data packets of the data flow from the source device to the destination device based on the shadow address further causes the computing device to:

configure the source device to use the shadow address as the destination address in data packets transmitted by the source device; and configure the destination device to process data packets having a destination address corresponding to the shadow address; and forward one or more data packets in the data flow from the source device to the destination device using the shadow address for the destination device.

11. The computer program product of claim 10, wherein configuring the source device to use the shadow address as the destination address comprises transmitting to the source device an Address Resolution Protocol (ARP) message indicating to the source device that the destination address for the destination device has changed to the shadow address.

12. The computer program product of claim 10, wherein configuring the destination device to process data packets having a destination address corresponding to the shadow address comprises configuring a network adapter of the destination device to be in a promiscuous mode of operation.

13. The computer program product of claim 10, wherein the computer readable program causes the computing device to configure the network infrastructure to route data packets of the data flow from the source device to the destination device based on the shadow address at least by:

deploying, at a source edge switch, a first rule to replace, in headers of data packets belonging to the data flow, a destination address corresponding to the destination address of the destination device with the shadow address; and deploying, at a destination edge switch, a second rule to replace, in headers of data packets belonging to the data flow, the shadow address to the destination address of the destination device.

14. The computer program product of claim 13, wherein at least one of the source edge switch or the destination edge switch is a virtual switch in a hypervisor.

15. The computer program product of claim 10, wherein the computer readable program causes the computing device to configure the network infrastructure to route data packets of the data flow from the source device to the destination device based on the shadow address at least by:

prior to receiving the request, pre-configuring switches in the network infrastructure with pre-configured matching rules based on the shadow address; and enabling utilizing of the pre-configured matching rules in the switches of the network infrastructure by configuring the source device to use the shadow address as the destination address for the destination device.

16. The computer program product of claim 10, wherein the shadow address is a shadow Media Access Control (MAC) address and the shadow address pool is a pool of shadow MAC addresses.

17. The computer program product of claim 11, wherein the computer readable program causes the computing device to configuring the network infrastructure of the network to route data packets of the data flow from the source device to the destination device based on the shadow address at least by:

deploying, to switches of the network infrastructure, one or more matching rules specifying the shadow address as a matching condition of the matching rules, and a corresponding action to be performed on data packets having the shadow address as a destination address in the headers of the data packets.

18. An apparatus comprising:
a processor;
a memory coupled to the processor; and
a network interface that couples the apparatus to a network, wherein the memory comprises instructions executed by the processor that cause the processor to:

receive, from a network control application, a request to establish a network configuration corresponding to a data flow between a source device and a destination device, wherein the request comprises a fine grained header field tuple for defining the data flow and wherein the fine grained header field tuple comprises a destination address and at least one of a source address, a source port, a destination port, and a protocol;

allocate, from a shadow address pool, a shadow address to be mapped to the fine grained header field tuple, wherein the shadow address pool comprises addresses not being used by devices coupled to the network and wherein the shadow address replaces the destination address for the destination device in the data flow;

configure a network infrastructure of the network to route data packets of the data flow from the source device to the destination device based on the shadow address, wherein the instructions to configure the network infrastructure to route data packets of the data flow from the source device to the destination device based on the shadow address further causes the processor to:

configure the source device to use the shadow address as the destination address in data packets transmitted by the source device; and configure the destination device to process data packets having a destination address corresponding to the shadow address; and forward one or more data packets in the data flow from the source device to the destination device using the shadow address for the destination device.

19. The apparatus of claim 18, wherein configuring the source device to use the shadow address as the destination address comprises transmitting to the source device an Address Resolution Protocol (ARP) message indicating to the source device that the destination address for the destination device has changed to the shadow address.

20. The apparatus of claim 18, wherein configuring the destination device to process data packets having a destination address corresponding to the shadow address comprises configuring a network adapter of the destination device to be in a promiscuous mode of operation.

* * * * *